United States Patent
Liu et al.

(10) Patent No.: US 9,785,562 B2
(45) Date of Patent: Oct. 10, 2017

(54) ADJUSTING ALLOCATION OF STORAGE DEVICES

(71) Applicant: International Business Machines Corporation, Armonk, NY (US)

(72) Inventors: Yang Liu, Shanghai (CN); Yi Yang, Shanghai (CN); Jun Wei Zhang, Shanghai (CN); Xin Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/709,539

(22) Filed: May 12, 2015

(65) Prior Publication Data

US 2015/0347303 A1    Dec. 3, 2015

(30) Foreign Application Priority Data

May 30, 2014  (CN) .......................... 2014 1 0240466

(51) Int. Cl.
*G06F 12/0871* (2016.01)
*G06F 3/06* (2006.01)
(Continued)

(52) U.S. Cl.
CPC ........ *G06F 12/0871* (2013.01); *G06F 3/0608* (2013.01); *G06F 3/0631* (2013.01);
(Continued)

(58) Field of Classification Search
CPC .... G06F 3/0608; G06F 3/0631; G06F 3/0653; G06F 3/0656; G06F 3/0679; G06F 12/0638; G06F 12/0871; G06F 11/00
(Continued)

(56) References Cited

U.S. PATENT DOCUMENTS 8,195,878 B2   6/2012  Mittendorff et al.
8,407,403 B2   3/2013  Prabhakaran et al.
(Continued)

FOREIGN PATENT DOCUMENTS

CN    104375961 A    2/2015

OTHER PUBLICATIONS

Hayashi, S. and Komoda, N., "Evaluation of Exclusive DAta Allocation Between SSD Tier and SSD Cache in Storage Systems", 2014, In Proceedings of the 16th International Conference on Enterprise Information Systems (ICEIS—2014), pp. 144-151.*
(Continued)

*Primary Examiner* — Reginald Bragdon
*Assistant Examiner* — Aaron D Ho
(74) *Attorney, Agent, or Firm* — Noah A. Sharkan; A. Imtiaz Billah

(57) ABSTRACT

Embodiments of the present invention provide methods, computer systems, and computer program products for adjusting allocation of a storage device. In one embodiment, a first part of the storage device is allocated to tiering storage, and a second part of the storage device is allocated to cache storage. Operating statuses of the first part and second part are collected. A performance measure of the first part is obtained based on the operating status of the first part, and a performance measure of the second part is obtained based on the operating status of the second part. Allocation of a capacity of the storage devices is adjusted between the first part and the second part based on the performance measures of the first part and the second part.

18 Claims, 8 Drawing Sheets

(51) Int. Cl.
*G06F 12/06* (2006.01)
*G06F 11/00* (2006.01)

(52) U.S. Cl.
CPC .......... *G06F 3/0653* (2013.01); *G06F 3/0656* (2013.01); *G06F 3/0679* (2013.01); *G06F 11/00* (2013.01); *G06F 12/0638* (2013.01)

(58) Field of Classification Search
USPC ........................................................ 711/102
See application file for complete search history.

(56) References Cited

U.S. PATENT DOCUMENTS

| | | | |
|---|---|---|---|
| 2009/0019251 A1* | 1/2009 | Helman | G06F 17/30138 711/171 |
| 2009/0210620 A1 | 8/2009 | Jibbe et al. | |
| 2011/0302365 A1 | 12/2011 | Heo et al. | |
| 2012/0057407 A1 | 3/2012 | Montgomery et al. | |
| 2012/0210058 A1 | 8/2012 | Mittendorff et al. | |
| 2012/0317338 A1 | 12/2012 | Yi et al. | |
| 2012/0331222 A1 | 12/2012 | Jibbe et al. | |
| 2013/0086300 A1 | 4/2013 | Luca | |
| 2013/0132638 A1* | 5/2013 | Horn | G06F 12/0871 711/103 |
| 2013/0191582 A1 | 7/2013 | Shiwalkar et al. | |
| 2013/0238851 A1 | 9/2013 | Chang et al. | |
| 2013/0275653 A1 | 10/2013 | Ranade et al. | |
| 2013/0275672 A1 | 10/2013 | Bert | |

OTHER PUBLICATIONS

O'Brien, Kevin, "Micron P400m Enterprise SSD Review", Feb. 13, 2013, retrieved from StorageReview.com.*
Hayashi, S. and Komoda, N., "Evaluation of SSD Tier Method and SSD Cache Method in Tiered Storage System", 2013, In Proceedings of the Second Asian Conference on Information Systems, pp. 8-14.*
Rollins, D., "Best Practices for SSD Performance Measurement", 2011, Micron TEchnology, Inc. Technical Marketing Brief.*
Kim, E., "SSD Performance—A Primer: An Introduction to Solid State Drive Perfromance, Evaluation and Test", Aug. 2013, presented by Storage Networking Industry Association.*
Appuswamy et al., "Integrating Flash-based SSDs into the Storage Stack", Apr. 16-20, 2012, 12 pages, 978-1-4673-1747-4/12 © 2013 IEEE, noted in search report Feb. 5, 2014, <http://ieeexplore.ieee.org/xpl/articleDetails.jsp?tp=&arnumber=6232365&searchWithin%3DCache%26searchWithin%3DDynamic+Storage+Tiering%26queryText%3DSSD>.
Li et al., "An Efficient SSD-based Hybrid Storage Architecture for Large-scale Search Engines", pp. 1-10, 2012 41st International Conference on Parallel Processing, pp. 450-459, DOI 10.1109/ICPP.2012.17, © 2012 IEEE.
Shi et al., "Optimal disk storage allocation for multi-tier storage system", A*STAR, Singapore, Singapore, Oct. 31, 2012-Nov. 2, 2012, 7 pages, noted in search report Feb. 5, 2014, <http://ieeexplore.ieee.org/xpl/articleDetails.jsp?tp=&arnumber=6401689&searchWithin%3DMulti-tier+Storage%26queryText%3DSSD>.
"Adjusting Allocation of Storage Device", China Patent Application No. 201410240466.9, filed on May 30, 2014, pp. 1-34.

* cited by examiner

ADJUSTING ALLOCATION OF STORAGE DEVICES

BACKGROUND OF THE INVENTION

Various embodiments of the present invention relate to storage systems, and more specifically, to a method and apparatus for adjusting the allocation of a storage device in a storage system.

With the development of computer hardware and software technologies, besides providing mass data storage, storage systems also have increasingly higher performance. Compared with traditional Hard Disk Drives (HDD), Solid State Disks (SSDs) can provide higher performance parameters.

Due to high unit price of SSDs, conventional storage systems mainly use HDDs as storage media. So far, technical solutions have been achieved where SSDs are used as cache storage or as tiering storage in storage systems. By introducing SSDs to a storage system, it is possible to enhance the performance of the storage system to some extent. Nevertheless, it should be noted although both cache storage and tiering storage can be effective approaches to enhancing the performance of a storage system, they have their own distinct advantages and are suitable for different application environments.

In existing technical solutions, once an SSD has been used as cache storage or tiering storage, its usage cannot change while the storage system is running. In other words, the usage of SSDs cannot typically be adjusted with the change of an application environment under current technical solutions.

SUMMARY

In one embodiment of the present invention, there is provided a method for adjusting the allocation of a storage device, a first part of the storage device being allocated to tiering storage, a second part of the storage device being allocated to cache storage, the method comprising: collecting an operating status of the first part and an operating status of the second part; obtaining a performance measure of the first part based on the operating status of the first part; obtaining a performance measure of the second part based on the operating status of the second part; and adjusting allocation of a capacity of the storage device between the first part and the second part based on the performance measure of the first part and the performance measure of the second part.

In another embodiment of the present invention, there is provided an apparatus for adjusting the allocation of a storage device, a first part of the storage device being allocated to tiering storage, a second part of the storage device being allocated to cache storage, the apparatus comprising: a collecting module configured to collect an operating status of the first part and an operating status of the second part; a first obtaining module configured to obtain a performance measure of the first part based on the operating status of the first part; a second obtaining module configured to obtain a performance measure of the second part based on the operating status of the second part; and an adjusting module configured to adjust allocation of a capacity of the storage device between the first part and the second part based on the performance measure of the first part and the performance measure of the second part.

In another embodiment of the present invention, there is provided a computer program product for adjusting allocation of a storage device, a first part of the storage device being allocated to tiering storage, a second part of the storage device being allocated to cache storage, the computer program product comprising: one or more computer readable storage media and program instructions stored on the one or more computer readable storage media, the program instructions comprising: program instructions to collect an operating status of the first part and an operating status of the second part; program instructions to obtain a performance measure of the first part based on the operating status of the first part; program instructions to obtain a performance measure of the second part based on the operating status of the second part; and program instructions to adjust allocation of a capacity of the storage device between the first part and the second part based on the performance measure of the first part and the performance measure of the second part.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments of the present invention provide technical solutions capable of adjusting the allocation of a storage device on the basis of operating status of the storage system. Embodiments of the present invention can dynamically adjust the ratio between a part of a capacity of the storage device allocated to cache and a part of the capacity of the storage device allocated to tiering on the basis of operating statuses of the storage system.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
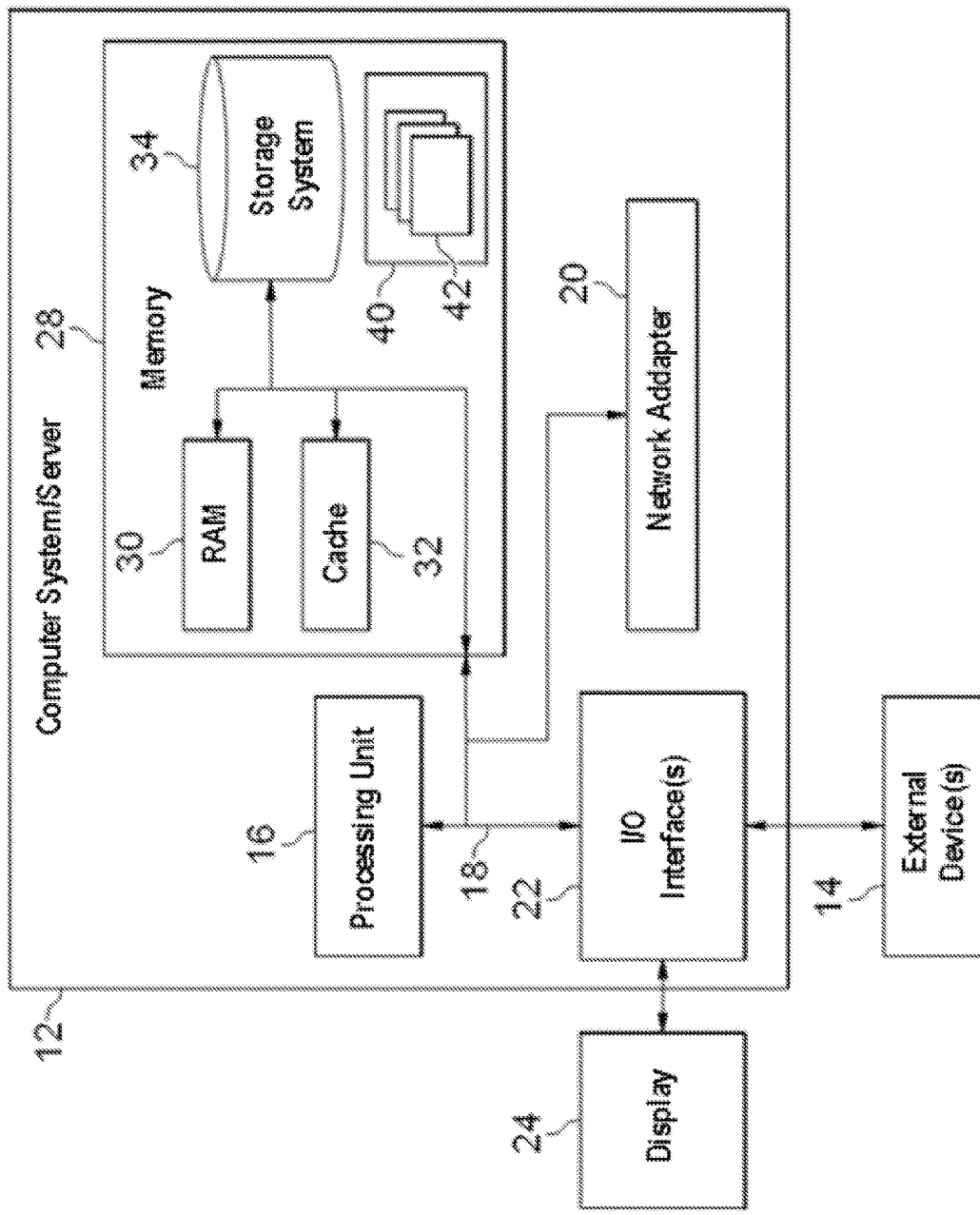
FIG. 1 schematically shows an exemplary computer system/server 12, which is applicable to implement embodiments of the present invention.

Referring now to FIG. 1, in which an exemplary computer system/server 12 applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to one or more processors or processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Although SSDs boast higher performance, their unit price is much higher than that of conventional HDDs, so conventional storage system typically use HDDs as main storage media while SSDs are used as cache storage and/or tiering storage. The principle of both cache storage and tiering storage lies in using storage devices with higher access performance to store "hotter" data and further boost the access performance of the entire storage system. However, since cache storage and tiering storage are implemented under different principles, they are suitable for different application environments.

In the context of the present invention, principles of the present invention are illustrated by taking SSDs as examples of storage devices with higher access performance. However, it should be understood that in the context of the present invention, examples of storage devices are not limited to SSDs but may include, without limitation, any other storage devices with higher access performance than HDDs that are currently known or to be developed later.

Figure 2A:
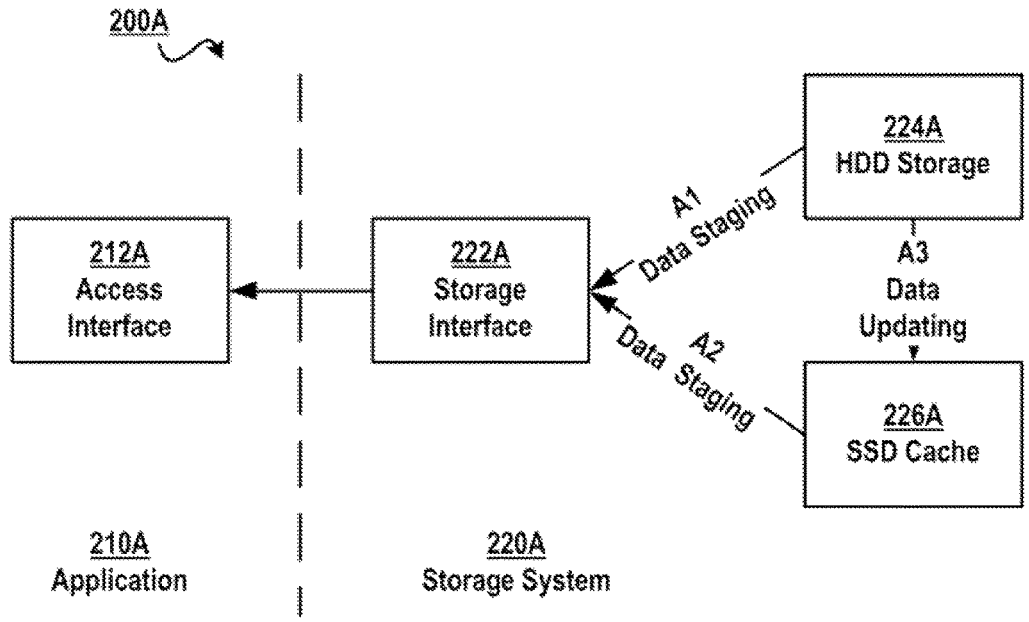
FIG. 2A shows a schematic view of a technical solution for using a storage device as cache storage, according to one embodiment of the present invention.
Figure 2B:
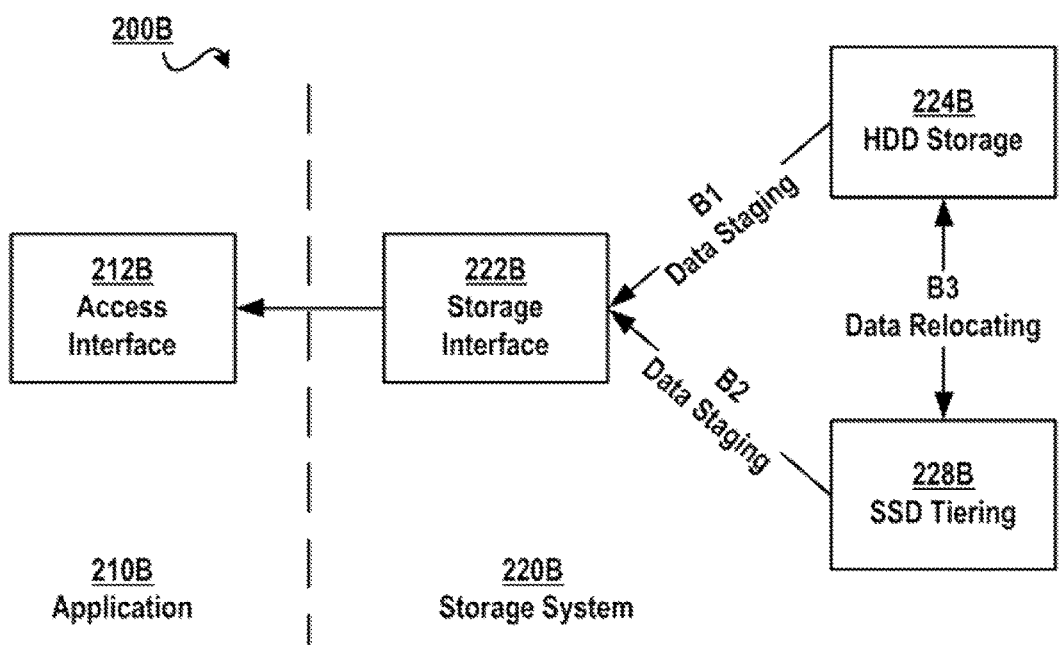
FIG. 2B shows a schematic view of a technical solution for using a storage device as tiering storage, according to one embodiment of the present invention.

FIG. 2A shows a schematic view of a technical solution where storage devices are used as cache storage, according to an embodiment of the present solution. In contrast, FIG. 2B shows a schematic view of a technical solution where storage devices are used as tiering storage, according to an embodiment of the present invention. As shown in technical solution 200A, storage devices are used as cache storage containing a storage system 220A which comprises: storage interface 222A, HDD storage 224A, and SSD cache 226A. At this point, data in SSD cache 226A may be updated according to a series of predefined rules. For example, data can be updated using a Least Recently Used (LRU) algorithm.

In the schematic view as shown in FIG. 2A, in response to receiving data access from an access interface 212A in an application 210A, storage system 220A implements data staging via a storage interface 222A to access interface 212A in application 210A (Data Stage). At this point, if accessed data is stored in SSD cache 226A, then SSD cache 226A with higher access performance directly implements data staging to storage interface 222A (as shown by arrow A2), and the response time for data access is quite quick, e.g., 2 ms; if accessed data is not stored in SSD cache 226A but in HDD storage 224A, then a search is conducted in HDD storage 224A with lower access performance, and data staging is implemented through an operation as shown by arrow A1, at which point the response time for data access is rather slow, e.g., 10 ms. Arrows A1, A2, and A3 represent data staging operations. Storage system 200A implements data updating from HDD storage 224A to SSD cache 226A, as shown by arrow A3.

In technical solution 200B as shown in FIG. 2B, the storage devices are used as tiering storage containing storage system 220B which comprises: storage interface 222B, HDD storage 224B and SSD tiering 228B. At this point, data relocation is periodically implemented between SSD tiering 228B and HDD storage 224B (as shown by arrow B3). The data relocation may be executed according to a series of predefined rules to relocate data that is more likely to be accessed to SSD tiering 228B, so as to enhance the access performance. In the schematic view shown in FIG. 2B, in response to receiving access from an access interface 212B in an application 210B, HDD storage 224B and SSD tiering 228B in storage system 220B may implement data staging via a storage interface 222B (as shown by arrow B1 and arrow B2 respectively).

The technical solutions as shown in FIGS. 2A and 2B can enhance the access performance of storage systems to some extent by using SSD storage with higher access performance. Nevertheless, since cache storage and tiering storage are suitable for different application scenarios, their access performance can be rather unsatisfactory in some cases.

On the one hand, tiering storage is more suitable for application scenarios of cycling read. Typically, cycling read reads different data one by one, and thus the cache hit ratio is rather low, and the cache typically cannot be brought into full play. For example, suppose users want to sequentially read a big amount of data from a storage system (for example, 400 GB) and do data analysis afterward; after the data analysis, users will re-read the 400 GB of data and do data analysis once again; subsequently, the whole read-analyze process is executed circularly.

Suppose a current capacity of a cache is 384 GB and is updated using an LRU algorithm. Since 384 is less than 400, the cache is not able to hold the total 400 GB of data. At this point, with the LRU algorithm, the first 16 GB data will be paged out from the cache after the first reading cycle, but that 16 GB of data is what the next cycle needs to read, so the 16 GB of data will be read from HDD rather than cache. Afterward, a next data block of 16 GB of data will be read from HDD for the same reason. So the cache hit ratio for a specific time period is 0%. In this case, the cache is not used and does not help to improve the access performance of the storage system. At this point, it is desirable to reallocate, in case of cycling reading, the capacity of the SSD that used to be allocated to cache storage for use as tiering storage, for example, so as to improve performance of the storage system.

On the other hand, cache storage is more suitable for "delete-define" application scenarios, which can be quite common in applications of the financial sector. For example, an application in the financial sector may run at night to analyze intermediate data that is generated in the daytime, and delete the intermediate data after the analysis is performed. Since the deleted intermediate data will not be accessed again, the intermediate data may not be suitable to be stored in tiering storage, but may be more suitable to be stored in a cache. In this case, it is desirable to reallocate, in case of "delete-define," capacity of the SSD that used to be allocated to tiering storage to be used as cache storage, for example, so as to improve performance of the storage system.

In the prior art, however, capacities of tiering and cache are typically set during the initialization of a storage system and cannot be changed when running. In view of this drawback, it is desirable to achieve a technical solution capable of changing the allocation of storage devices during the running of a storage system, so as to adjust, according to an application scenario of the storage system, whether storage devices are allocated as cache or tiering, and it is desirable to adjust the ratio of capacities between cache and tiering.

In view of the foregoing drawback, an embodiment of the present invention proposes a method for adjusting the allocation of a storage device, a first part of the storage device being allocated to tiering storage, a second part of the storage device being allocated to cache storage, the method comprising: collecting operating status of the first part and operating status of the second part, respectively; obtaining performance measure of the first part on the basis of the operating status of the first part; obtaining performance measure of the second part on the basis of the operating status of the second part; and adjusting the allocation of a capacity of the storage device between the first part and the second part on the basis of the performance measure of the first part and the performance measure of the second part.

Figure 3:
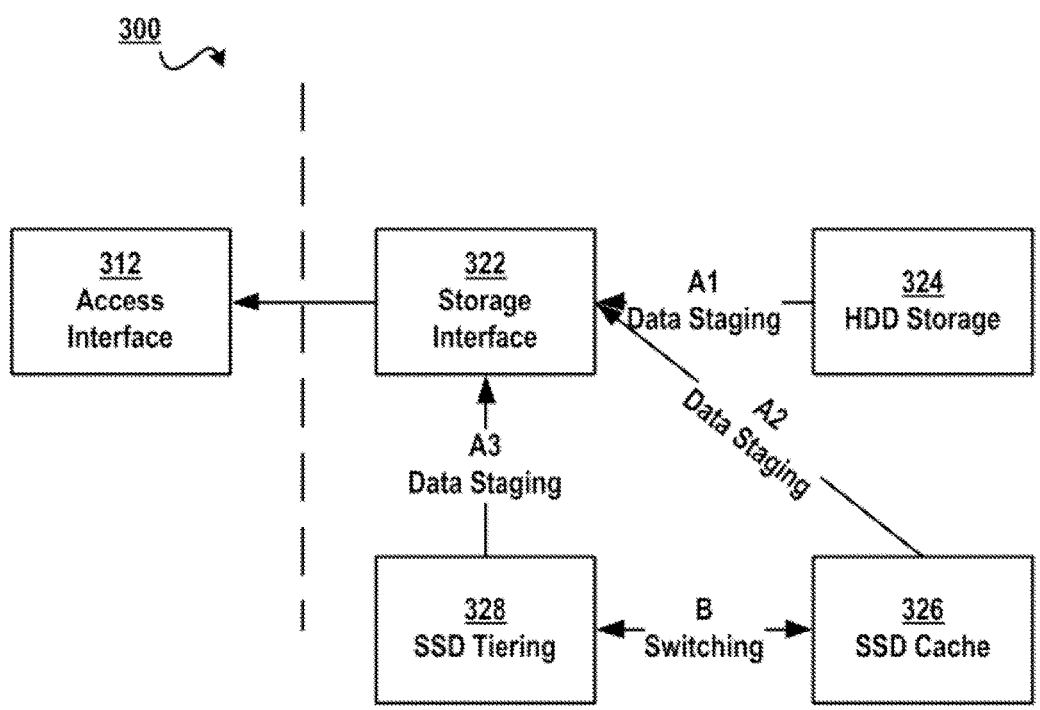
FIG. 3 schematically shows a diagram of a technical solution for adjusting the allocation of a storage device, according to one embodiment of the present invention.

FIG. 3 schematically shows a diagram 300 of a technical solution for adjusting the allocation of a storage device, according to one embodiment of the present invention. As shown, according to one embodiment of the present invention, a storage system 330 comprises a storage interface 322, HDD storage 324, SSD cache 326 and SSD tiering 328. Furthermore, HDD storage 324, SSD cache 326 and SSD tiering 328 can implement data staging through operations shown by arrows A1-A3, respectively. In this embodiment, respective capacities of SSD cache 326 and SSD tiering 328 are not fixed, but may change as the application environment changes (as shown by arrow B). When an SSD switches from one type to another, it is operated according to a rule of the switched type. For example, when an SSD with a certain capacity switches from tiering storage to cache storage, the update is made according to a data update rule for cache (e.g., LRU algorithm).

Using a technical solution of the present invention, when it is found that the performance of the storage system can be enhanced by increasing the capacity of cache in the storage system, at least one part of the capacity of a storage device that is allocated to tiering may be reallocated to cache; when it is found that the performance of the storage system can be enhanced by increasing the capacity of tiering in the storage system, at least one part of the capacity of a storage device that is allocated to cache may be reallocated to tiering. Using the method and apparatus as described in the present invention, the allocation of a storage device may be adjusted on the basis of operating status of a storage system, and further the data access performance can be enhanced.

Figure 4:
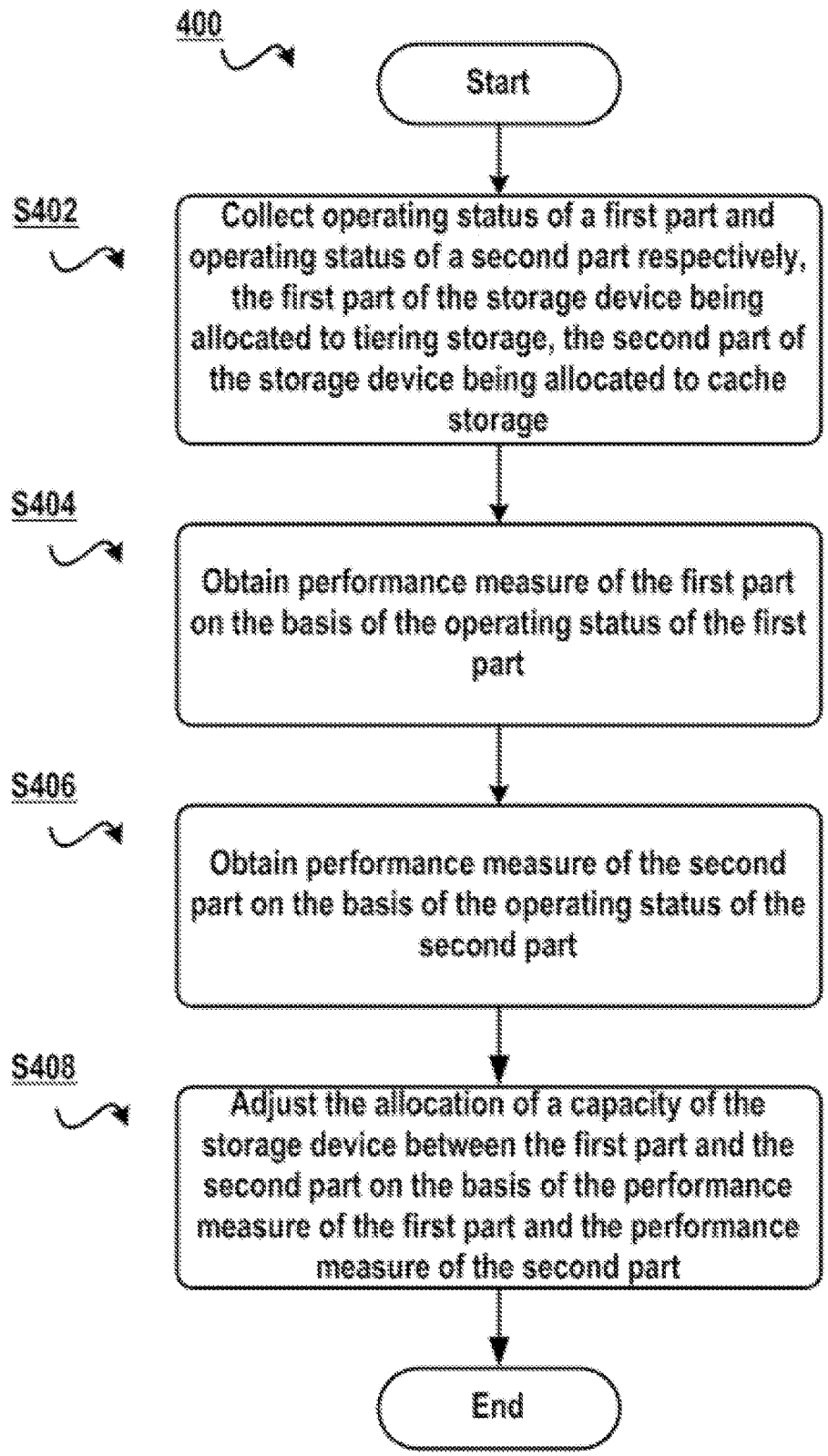
FIG. 4 schematically shows a flowchart of a method for adjusting the allocation of a storage device, according to one embodiment of the present invention.

FIG. 4 schematically shows a flowchart 400 of a method for adjusting the allocation of a storage device, according to one embodiment of the present invention. Specifically, there is provided a method for adjusting the allocation of a storage device, a first part of the storage device being allocated to tiering storage, a second part of the storage device being allocated to cache storage. Initially, corresponding allocation ratios may be set with respect to different storage types. For example, 80% of the storage devices may be set for tiering storage, and 20% may be used as cache storage. The ratios discussed here are examples, and those skilled in the art may select an appropriate initial allocation ratio according to parameters of a particular application environment. For example, where there exists a large amount of "delete-define," a higher allocation ratio may be set for cache storage.

In operation S402, an operating status of the first part and an operating status of the second part are collected. In this embodiment, the purpose of monitoring operating statuses is to obtain a current application environment, so as to determine, on the basis of the current running environment in a subsequent operation, which type of storage devices (tiering storage or cache storage) can increase the data access performance. Thus, respective operating statuses of the parts used as tiering storage and cache storage may be monitored in this operation.

In operation S404, a performance measure of the first part is obtained on the basis of the operating status of the first part; in operation S406, a performance measure of the second part is obtained on the basis of the operating status of the second part. In this embodiment, the purpose of obtaining performance measures associated with the respective parts is to learn how much the access performance can be improved when the storage device is allocated to tiering storage or to cache storage, respectively.

In operation S408, the allocation of a capacity of the storage devices between the first part and the second part is adjusted on the basis of the performance measure of the first part and the performance measure of the second part. As the performance measures associated with tiering storage and cache storage have been obtained in operation S404 and operation S406, respectively, in this operation, it can be measured how much the two performance measures can improve the access performance of the entire storage system, and a storage type that better helps to increase the access performance is selected, and the allocation between the first part and the second part is adjusted. In other words, the adjusted allocation between the first part and the second part is an example of reallocating portions of the storage system.

In an example of reallocating portions of the storage system, after collecting operating statuses associated with tiering storage and cache storage, and finding that currently there is a lot of cycling read among access operations and the performance measure of tiering storage is higher than the performance measure of cache storage, the allocation ratio between the two storage types may be adjusted such that 81% of the capacity is allocated to tiering storage and the remaining 19% is allocated to cache storage. In this manner, an allocation mode that is more suitable for the current application environment may be selected, and the data access performance may be increased.

For the purpose of description, hereinafter the operating status and performance measure of the first part are referred to as first operating status and first performance measure, respectively, and the operating status and performance measure of the second part are referred to as second operating status and second performance measure, respectively.

In one embodiment of the present invention, at least one of the operating status of the first part and the operating status of the second part comprises a set of response time for a set of access to the corresponding part. Specifically, the first operating status at least comprises a first set of response time for a first set of access to the first part, and the second operating status at least comprises a second set of response time for a second set of access to the second part. Since response time is an important parameter reflecting the data access performance, the response time for the first part allocated to tiering storage in the storage device and the response time for the second part allocated to cache storage in the storage device may be collected respectively.

Since the response time is response time of the storage device after they are hit, a set of response time may be used to measure response time for a set of hits to the storage device. For example, suppose 20% of the capacity of the storage device is allocated to cache storage and the number of hits with respect to the cache storage in a collection cycle is n, then response time may be stored as an n-dimensional vector $\{RT_1, \ldots, RT_i, \ldots, RT_n\}$, where $RT_i$ in the vector denotes response time for the $i^{th}$ hit. Accordingly, response time associated with tiering storage may further be obtained in a similar way.

In one embodiment of the present invention, at least one of the obtaining performance measure of the first part on the basis of the operating status of the first part and the obtaining performance measure of the second part on the basis of the operating status of the second part comprises: obtaining performance measure of a corresponding part at least on the basis of a sum of the set of response time. Specifically, the obtaining performance measure of the first part on the basis of the operating status of the first part comprises obtaining the first performance measure at least on the basis of a sum of the first set of response time; and the obtaining performance measure of the second part on the basis of the operating status of the second part comprises obtaining the second performance measure at least on the basis of a sum of the second set of response time.

Figure 5A:
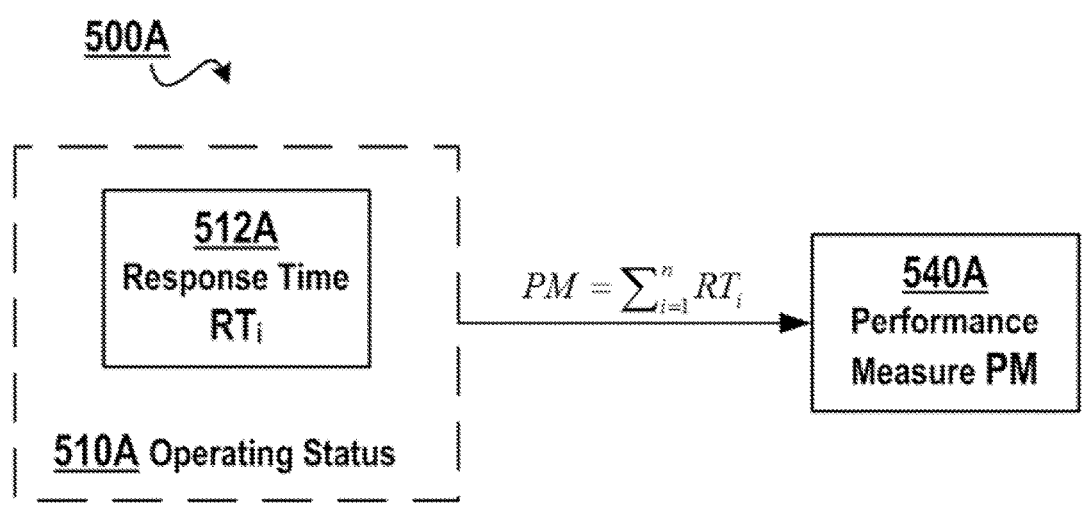
FIGS. 5A and 5B show respective schematic views of a method for calculating performance measure, according to one embodiment of the present invention.

FIG. 5A shows a schematic view 500A of a method for calculating performance measure, according to one embodiment of the present invention. In an exemplary embodiment, the operating status of a first part and the operating status of a second part are associated with operating status 510A for tiered storage. Continuing the foregoing example, suppose response time $RT_i$ 512A associated with tiering storage has been obtained (the first set of response time being $\{RT_1, \ldots, RT_i, \ldots, RT_n\}$) and there are n hits with respect to the tiering storage; at this point, the first performance measure (performance measure PM 540A) associated with tiering storage may be obtained on the basis of Equation 1 below:

$$PM = \sum_{i=1}^{n} RT_i \qquad \text{Equation 1}$$

Similarly, those skilled in the art may further obtain the second performance measure associated with cache storage on the basis of Equation 1. In another exemplary embodiment, the operating status of a first part and the operating status of a second part are associated with operating status 510A for cache storage. Furthermore, performance measure PM 540A for cache storage is obtained by applying Equation 1.

In one embodiment of the present invention, the number of hits with respect to the first part and the second part may be used as the first performance measure and the second performance measure, respectively.

In one embodiment of the present invention, at least one of the operating status of the first part and the operating status of the second part comprises an additional status, the additional status comprising at least one of read/write type, data amount and position characteristic associated with the set of access. For example, the first operating status can further comprise a first set of additional statuses, which comprises at least one of read/write type, data amount and position characteristic associated with the first set of access; the second operating status can further comprise a second set of additional statuses, which comprises at least one of read/write type, data amount and position characteristic associated with the second set of access.

Response time reflects a performance measure, and, additionally, the performance measure might further be affected by other factors. For example, with respect to read access and write access, response performance might vary slightly. Specifically, response performance of the SSD to read operations might be higher than write operations. In another example, the data amount involved in an access operation may also affect response performance. Specifically, the larger the data amount, the longer the response time and the smaller the extent of improvement made by SSD. In another example, a position characteristic of accessed data may also affect performance measure. Specifically, with respect to a random access operation, an SSD can provide a greater performance improvement; with respect to a sequential access operation, an SSD provides a lesser performance improvement.

Therefore, while collecting operating statuses, additional statuses may further be collected (for example, including at least one of read/write type, data amount and location feature associated with data access) so as to take various respects into consideration when calculating performance measures.

In one embodiment of the present invention, the obtaining performance measure of a corresponding part at least on the basis of a sum of the set of response time comprises: calculating a weight on the basis of the additional status; and obtaining performance measure of a corresponding part on the basis of a sum of the set of response time that is weighted using the weight. Specifically, the obtaining the first performance measure at least on the basis of the first set of response time comprises: calculating a weight on the basis of the first set of additional status, and obtaining the first performance measure on the basis of a sum of the first set of response time that is weighted using the first weight. Further, the obtaining the second performance measure at least on the basis of the second set of response time comprises: calculating a second weight on the basis of the second set of additional status, and obtaining the second performance on the basis of a sum of the second set of response time that is weighted using the second weight.

Figure 5B:
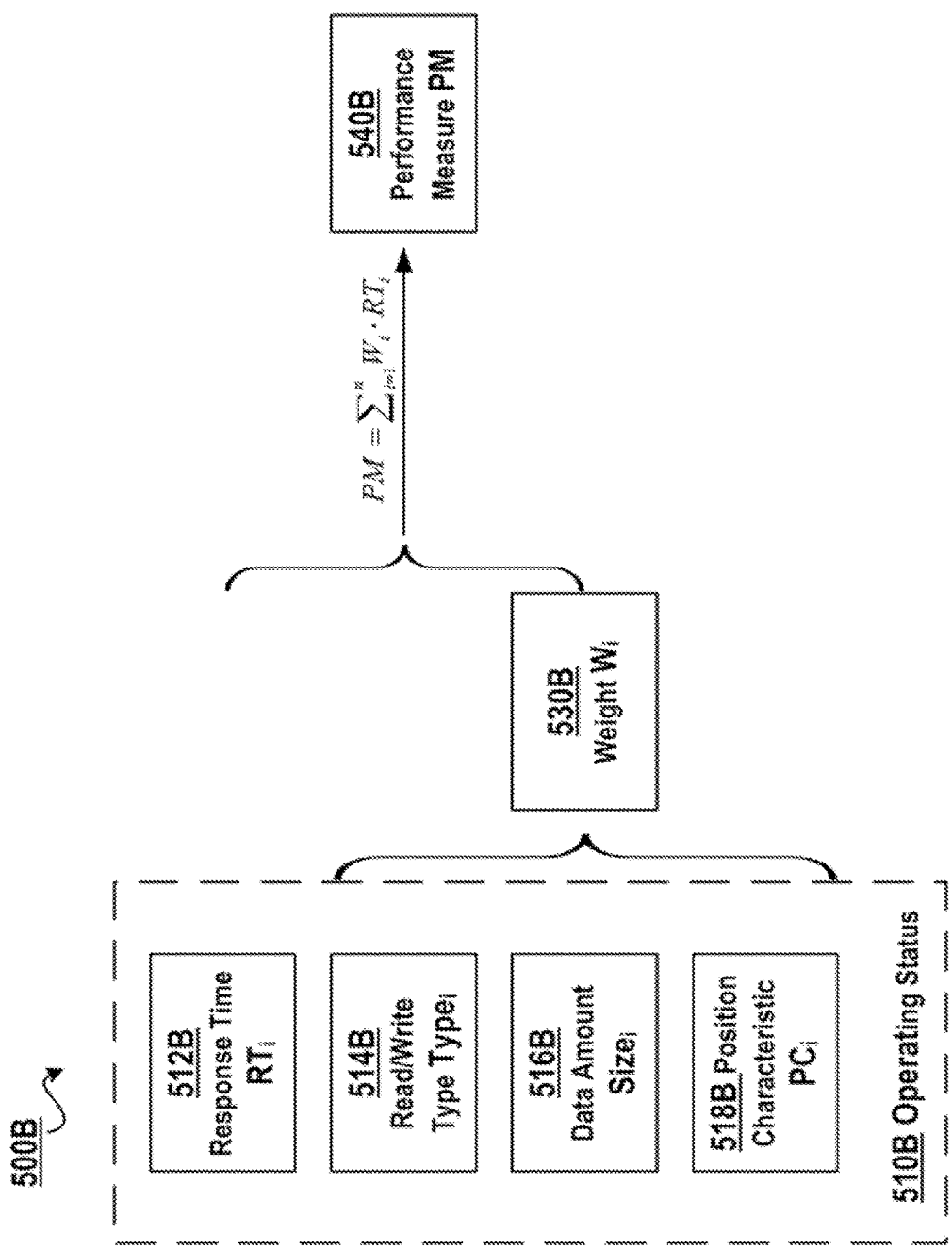

FIG. 5B shows a schematic view 500B of a method for calculating a performance measure, according to one embodiment of the present invention. In an exemplary embodiment, the operating status of a first part and the operating status of a second part are associated with operating status 510B for tiered storage. For example, a response time $RT_i$ 512B, a read/write type $Type_i$ 514B, a data amount $Size_i$ 516B and a position characteristic $PC_i$ 518B associated with a data access are collected; subsequently, a weight $W_i$ 530B with respect to the data access is calculated on the basis of read/write type $Type_i$ 514B, data amount $Size_i$ 516B and position characteristic $PC_i$ 518B; an overall performance measure PM 540B is calculated on the basis of Equation 2 below:

$$PM=\Sigma_{i=1}^{n} W_i \cdot RT_i \qquad \text{Equation 2}$$

Different weights may be set with respect to various respects of the additional status, and a performance measure can be calculated on the basis of both the weight and the response time. Illustration is presented below of a particular calculation method using an example. Suppose average response time for SSD tiering storage is 2 ms, and a weight with respect to the additional status is as shown in Table 1 below:

TABLE 1

Example of Weight

| Additional Status | | Weight |
|---|---|---|
| read/write type | read access | 0.6 |
| | write access | 0.4 |
| position characteristic | random access | 0.6 |
| | sequential access | 0.4 |
| . . . | . . . | . . . |

The foregoing weight example is exemplary only, and those skilled in the art may further use other approaches to representing an importance relationship in various additional statuses on the basis of a particular application environment.

For example, where an access with respect to tiering storage is read access and random access in the meantime, the weighted response time for the access may be calculated as $(0.6+0.6)\times 2=2.4$ ms. Where weighted response time for each access has been obtained, the first performance measure associated with tiering storage may be obtained. Similarly, those skilled in the art may further obtain the second performance measure associated with cache storage on the basis of the principle shown above.

Since the calculation under Equation 2 shown with reference to Table 1 can be rather complicated, Equation 3 may be used for the purpose of simplification:

$$PM=\Sigma_{i=1}^{n} SSDRatio \cdot RT_i = SSDRatio \Sigma_{i=1}^{n} RT_i \qquad \text{Equation 3}$$

where SSDRatio denotes improvement in response time that is made using SSD compared to HDD.

For example, where response time using an SSD is 2 ms, while response time using an HDD is 10 ms, then SSDRatio=$(10-2)/2=4$. In this manner, the calculation complication may be simplified.

In one embodiment of the present invention, a capacity of the first part is greater than a capacity of the second part, and the obtaining performance measure of the first part on the basis of the operating status of the first part comprises: selecting from the first part of the storage device a third part whose capacity is equal to that of the second part; and obtaining the performance measure of the first part on the basis of data associated with the third part in the operating status of the first part.

Historical experience shows that in conventional storage systems, tiering storage can be more beneficial to help the data access performance, so, typically, a large capacity of tiering storage is configured in storage systems. In embodiments of the present invention, the capacity of the first part allocated to tiering storage is greater than the capacity of the second part allocated to cache storage, for increasing the data access performance. When capacities of the first part and the second part are not equal, a phenomenon may arise where there is a dramatic difference between hits with respect to the two parts.

Figure 6:
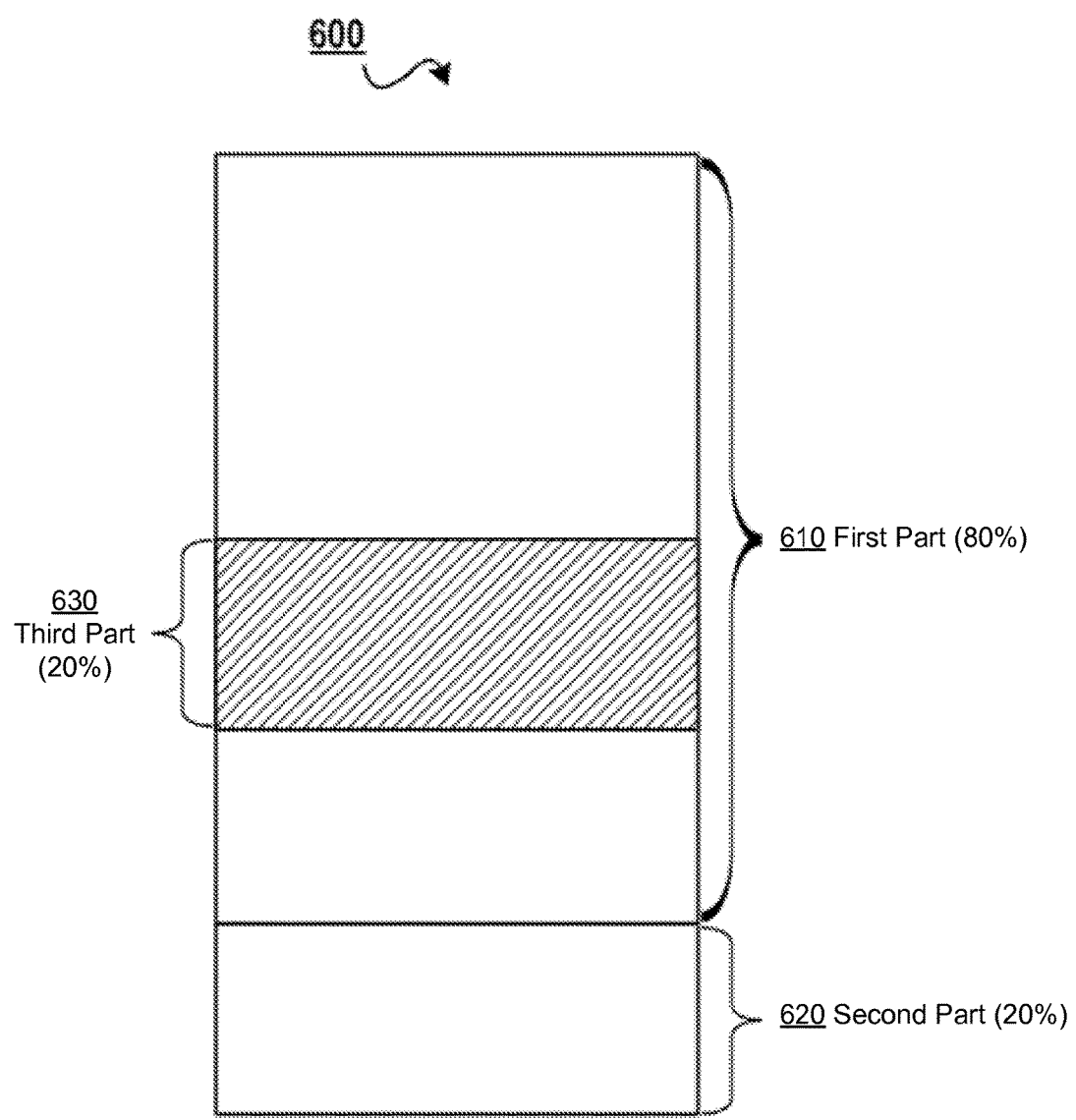
FIG. 6 shows a schematic view for calculating performance measure associated with tiering storage, according to one embodiment of the present invention.

FIG. 6 shows a schematic view 600 for calculating performance measure associated with tiering storage, according to one embodiment of the present invention. As shown in FIG. 6, continuing the foregoing example of storage device 640, where 80% of the capacity is allocated to tiering storage (a first part 610) and the remaining 20% is allocated to cache storage (a second part 620), since the capacity of tiering storage is much higher than that of cache storage (4 times), the number of hits with respect to tiering storage is much greater than the number of hits for cache storage. At this point, a capacity (i.e., a third part 630, occupying 20% of the capacity of a storage device) that is equal to the capacity of second part allocated to cache storage may be selected from the first part 610 allocated to tiering storage, and a performance measure associated with this part is obtained as performance measure associated with tiering storage (i.e., first performance measure).

Those skilled in the art may select the third part on the basis of different rules, such as, for example, sequentially select 20% of the capacity from the part used as tiering storage, randomly select 20% of the capacity therefrom, etc. Tiering storage may also be sorted in decreasing order by hit ratio per unit capacity, where 20% of the capacity is selected from sorted storage devices on the basis of a predefined rule. For example, 20% of the capacity with the lowest, the highest or middle hit ratio may be selected.

Specifically, if the capacity of a storage device is 100 GB, and the capacity is allocated in a ratio of 80%, then this leads to tiering storage of 80 GB. When sorted in decreasing order by hit ratio per GB, tiering storage of 80 GB may be sorted in decreasing order. In one embodiment, 20 GB of the lowest hit ratio may be selected from the sorted tiering storage, and performance measures associated with this part are used as performance measures of the entire tiering storage. In another embodiment, for simplifying operation, performance measures may be obtained by averaging. For example, with respect to tiering storage and cache storage, performance measures of the storage device per GB may be respectively calculated. In other embodiments of the present invention, particular values of performance measures may further be calculated using other equations.

The foregoing approaches can help ensure that storage devices acting as bases of performance devices have an equal capacity, and, in turn, the first performance measure and the second performance measure are measures with respect to storage devices having an equal capacity.

In one embodiment of the present invention, the allocation ratio between parts used as tiering storage and cache storage in the storage device may be adjusted on the basis of the first performance measure and the second performance measure. For example, when the first performance measure is higher than the second performance measure, a capacity having a higher ratio may be allocated to tiering storage; when the first performance measure is lower than the second performance measure, a capacity having a higher ratio may be allocated to cache storage. However, an additional setting operation may be involved when switching between tiering storage and cache storage, and other conditions for switching may further be considered in order to prevent excessive additional workloads caused by frequent switching between tiering storage and cache storage.

In one embodiment of the present invention, the adjusting the allocation of a capacity of the storage device between the first part and the second part on the basis of the performance measure of the first part and the performance measure of the second part comprises: reallocating at least one part of the first part in the storage device so as to be used as the cache storage in response to a difference between the performance measure of the first part and the performance measure of the second part satisfying a first threshold condition.

For example, the first threshold condition may be set as "the first performance measure is 10% or more lower than the second performance measure" (or those skilled in the art may further set other threshold condition on the basis of needs of a particular application environment). At this point, when the first performance measure associated with tiering storage is 10% lower than the second performance measure associated with cache storage, the part in the storage device that used to be allocated to tiering storage is reallocated to cache storage. In this manner, it is possible to avoid additional overheads caused by frequently changing capacities of tiering storage and cache storage.

In one embodiment of the present invention, the reallocating at least one part of the first part in the storage device to be used as the cache storage in response to a difference between the performance measure of the first part and the performance measure of the second part satisfying a first threshold condition comprises: keeping a capacity of the reallocated first part greater than or equal to a first threshold capacity.

Tiering storage and cache storage are two different approaches to improving the data access performance of the storage system, and they have distinct advantages under different application environments. Therefore, as a whole, ensuring that there are always two types of storage devices in a storage system can help to increase the data access performance of the storage system. Accordingly, during reallocation, it should be ensured the capacity of tiering storage is not lower than a specific threshold. For example, historical experience shows tiering storage can ensure higher data access performance, so a lower limit of the capacity of tiering storage may be set as 50%. In this embodiment, the first threshold capacity is 50%. The value 50% used here is only an exemplary lower-limit threshold, and those skilled in the art may further set other thresholds as a particular application environment demands. For example, when most of data access to the storage system belongs to cycling read, a higher lower-limit threshold may be set (e.g., 60%).

In one embodiment of the present invention, the adjusting the allocation of a capacity of the storage device between the first part and the second part on the basis of the performance measure of the first part and the performance measure of the second part comprises: in response to a difference between the performance measure of the first part and the performance measure of the second part satisfying a second threshold condition, reallocating at least one part of the second part in the storage device so as to be used as the tiering storage.

For example, the second threshold condition may be set as "the second performance measure is 10% or more lower than the first performance measure" (or those skilled in the art may further set other threshold conditions on the basis of needs of a particular application environment). At this point, when the second performance measure associated with cache storage is 10% lower than the first performance measure associated with tiering storage, the part in the storage device that used to be allocated to cache storage is reallocated to tiering storage. In this manner, it is possible to avoid additional overheads caused by frequently changing capacities of tiering storage and cache storage.

In one embodiment of the present invention, the reallocating at least one part of the second part in the storage device to be used as the tiering storage in response to a difference between the performance measure of the first part and the performance measure of the second part satisfying a second threshold condition comprises: keeping a capacity of the reallocated second part greater than or equal to a second threshold capacity.

For example, a lower limit of the capacity of cache storage may be set as 5%. In this embodiment, the second threshold capacity is 5%. The value 5% here is only an exemplary lower-limit threshold, and those skilled in the art may further set other thresholds as a particular application environment demands. For example, when most of data access to the storage system belongs to "delete-define," a higher lower-limit threshold may be set (e.g., 20%).

In the foregoing example, the first threshold capacity and the second threshold capacity are used as examples of a lower-limit threshold of tiering storage and cache storage, respectively. Those skilled in the art may further set an upper-limit threshold with respect to cache storage and tiering storage, respectively, for limiting the relative ratio between cache storage and tiering storage. This is not detailed here.

In the context of the present invention, those skilled in the art may further adjust the step size (i.e., portion of capacity for reallocation) of each adjustment according to needs of a particular application environment. For example, it may be set that each adjustment is made by taking 1% of the capacity of the storage device as a unit, or another step size may be set according to a difference between the first performance measure and the second performance measure. For example, when the first performance measure is lower than the second performance measure with a margin of 30% or more, the step size may be set as 5%.

In one embodiment of the present invention, other additional rules may further be set. For example, a rule can define that when data is already stored in tiering storage, the data cannot be loaded to cache storage.

In one embodiment of the present invention, the storage device is a solid state disk. In the context of the present invention, the storage device may be any other storage device with high access performance that is currently known or to be developed later, including, without limitation to, a solid state disk.

In one embodiment of the present invention, the method of the present invention is executed periodically. Those skilled in the art may select an execution cycle according to particular situation of the application environment. For example, a particular cycle may be selected according to periodical change of data access operations. With respect to an application environment like the financial sector, for example, where the day and night business volume is periodically distributed, it is possible to select 24 hours as one cycle.

Illustration is presented below for how to adjust the allocation between tiering storage and cache storage using an example. Continuing the foregoing example, suppose the capacity of an SSD storage device in the storage system is 10 T, and initially a capacity of 8 T is allocated to tiering storage, while the remaining 2 T is allocated to cache storage. At runtime, response time of the HDD is 10 ms and response time of the SSD is 2 ms. A performance measure is calculated using Equation 3, and the method of the present invention is executed in a cycle of 24 hours.

Suppose in 24 hours, the number of hits with respect to tiering storage of the bottom 2 T sorted by the number of hits is 16000, then the first performance measure associated with tiering storage is 4×2×16000=128000 ms.

Suppose in 24 hours, the number of hits with respect to cache storage of 2 T is 20000, then the second performance measure associated with cache storage is 4×2×20000=160000 ms.

Since (160000−128000)/128000=0.25, which is greater than 10%, then at this point, 1% of 8 T capacity (i.e., about 0.1 T) that used to be allocated to tiering storage is reallocated to cache storage. After the reallocation, the capacity used as tiering storage is about 7.9 T and the capacity used as cache storage is about 2.1 T.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing operations in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding operations. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 7:
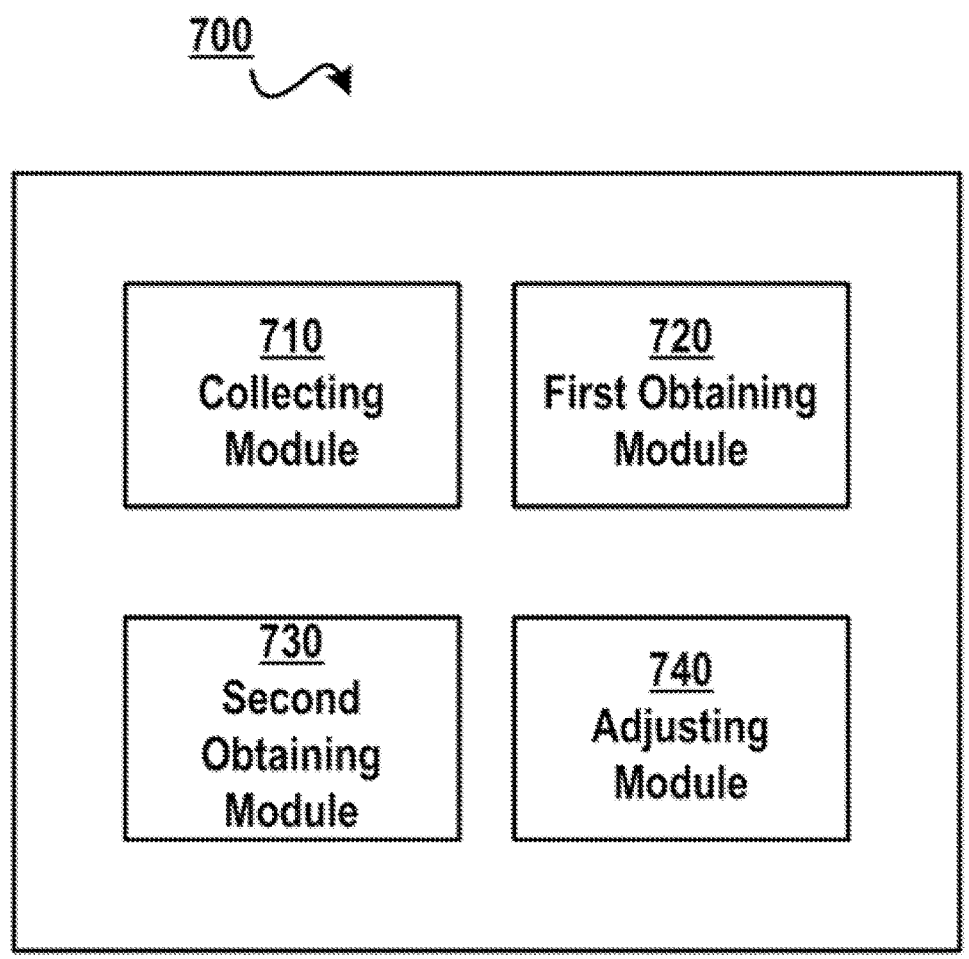
FIG. 7 schematically shows a block diagram of an apparatus for adjusting the allocation of a storage device, according to one embodiment of the present invention.

FIG. 7 shows a block diagram 700 of an apparatus for adjusting the allocation of a storage device, according to one embodiment of the present invention. Specifically, there is shown an apparatus for adjusting the allocation of a storage device, a first part of the storage device being allocated to tiering storage, a second part of the storage device being allocated to cache storage, the apparatus comprising: a collecting module 710 configured to collect operating status of the first part and operating status of the second part, respectively; a first obtaining module 720 configured to obtain performance measure of the first part on the basis of the operating status of the first part; a second obtaining module 730 configured to obtain performance measure of the second part on the basis of the operating status of the second part; and an adjusting module 740 configured to adjust the allocation of a capacity of the storage device between the first part and the second part on the basis of the performance measure of the first part and the performance measure of the second part.

In one embodiment of the present invention, at least one of the operating status of the first part and the operating status of the second part comprises a set of response time for a set of access to a corresponding part.

In one embodiment of the present invention, at least one of first obtaining module 720 and second obtaining module 730 comprises: a performance obtaining module configured to obtain performance measure of a corresponding part at least on the basis of a sum of the set of response time.

In one embodiment of the present invention, at least one of the operating status of the first part and the second operating status of the second part comprises additional status, the additional status comprising at least one of read/write type, data amount and position characteristic associated with the set of access.

In one embodiment of the present invention, the performance obtaining module comprises: a weighting module configured to calculate a weight on the basis of the additional status, and a calculating module configured to obtain performance measure of a corresponding part on the basis of a sum of the set of response time that is weighted using the weight.

In one embodiment of the present invention, a capacity of the first part is greater than a capacity of the second part, and first obtaining module 720 comprises: a selecting module configured to select from the first part of the storage device a third part whose capacity is equal to that of the second part; and a third obtaining module configured to obtain the performance measure of the first part on the basis of data associated with the third part in the operating status of the first part.

In one embodiment of the present invention, adjusting module 740 comprises: a first adjusting module configured to, in response to a difference between the performance measure of the first part and the performance measure of the second part satisfying a first threshold condition, reallocate at least one part of the first part in the storage device so as to be used as the cache storage.

In one embodiment of the present invention, the first adjusting module comprises: a first maintaining module configured to keep a capacity of the reallocated first part greater than or equal to a first threshold capacity.

In one embodiment of the present invention, the adjusting module comprises: a second adjusting module configured to, in response to a difference between the performance measure of the first part and the performance measure of the second part satisfying a second threshold condition, reallocate at least one part of the second part in the storage device so as to be used as the tiering storage.

In one embodiment of the present invention, the second adjusting module comprises: a second maintaining module configured to keep a capacity of the reallocated second part greater than or equal to a second threshold capacity.

Using the method and apparatus of the present invention, the allocation of the storage device may be adjusted on the basis of operating status of the storage system, so as to increase the performance of the storage system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adjusting allocation of a storage device, a first part of the storage device being allocated to tiering storage, a second part of the storage device being allocated to cache storage, the method comprising:
    collecting an operating status of the first part and an operating status of the second part;
    obtaining a performance measure of the first part based on the operating status of the first part;
    obtaining a performance measure of the second part based on the operating status of the second part;
    selecting, from the first part of the storage device, another part of the storage device whose capacity is equal to that of the second part;
    obtaining a performance measure of the other part based on an operating status of the other part;
    comparing the performance measure of the second part and the performance measure of the other part of the storage device; and
    adjusting allocation of a capacity of the storage device between the first part and the second part, based on the comparison of the performance measure of the second part and the performance measure of the other part of the storage device.

2. The method according to claim 1, wherein:
    at least one of the operating status of the first part and the operating status of the second part comprises a set of response times for data access to a corresponding part.

3. The method according to claim 2, wherein:
    at least one of the obtaining a performance measure of the first part based on the operating status of the first part and the obtaining a performance measure of the second part based on the operating status of the second part comprises:
    obtaining a performance measure of a corresponding part based at least on a sum of the set of response times.

4. The method according to claim 3, wherein:
    at least one of the operating status of the first part and the operating status of the second part comprises an additional status of at least one of read/write type, data amount, and position characteristic associated with the data access.

5. The method according to claim 4, wherein the obtaining a performance measure of a corresponding part based at least on a sum of the set of response times comprises:
    calculating a weight based on the additional status; and
    obtaining a performance measure of a corresponding part based on a sum of the set of response times that is weighted using the calculated weight.

6. The method according to claim 1, wherein the adjusting allocation of a capacity of the storage device between the first part and the second part based on the performance measure of the first part and the performance measure of the second part comprises:
    reallocating at least one part of the first part in the storage device to be used as cache storage, in response to a difference between the performance measure of the first part and the performance measure of the second part satisfying a first threshold condition, wherein the first threshold condition is the performance measure of the first part and the second part in the storage device.

7. The method according to claim 6, wherein a capacity of the reallocated at least one part of the first part in the storage device is kept greater than or equal to a first threshold capacity, wherein the first threshold capacity is associated with a first overall capacity of the first part and the second part in the storage device.

8. The method according to claim 1, wherein the adjusting allocation of a capacity of the storage device between the first part and the second part based on the performance measure of the first part and the performance measure of the second part comprises:
    reallocating at least one part of the second part in the storage device to be used as tiering storage, in response to a difference between the performance measure of the first part and the performance measure of the second part satisfying a second threshold condition, wherein the second threshold condition is the performance measure of the first part and the second part in the storage device.

9. The method according to claim 8, wherein a capacity of the reallocated at least one part of the second part in the storage device is kept greater than or equal to a second threshold capacity, wherein the second threshold capacity is associated with a second overall capacity of the first part and the second part in the storage device.

10. A computer system for adjusting allocation of a storage device, a first part of the storage device being allocated to tiering storage, a second part of the storage device being allocated to cache storage, the computer system comprising:
    one or more computer processors;
    one or more computer readable storage media; and
    program instructions stored on the one or more computer readable storage media for execution by at least one of the one or more computer processors, the program instructions comprising:
    program instructions to collect an operating status of the first part and an operating status of the second part;
    program instructions to obtain a performance measure of the first part based on the operating status of the first part;

program instructions to obtain a performance measure of the second part based on the operating status of the second part;

program instructions to select, from the first part of the storage device, another part of the storage device whose capacity is equal to that of the second part;

program instructions to obtain a performance measure of the other part based on an operating status of the other part;

program instructions to compare the performance measure of the second part and a performance measure of another part of the storage device; and program instructions to adjust allocation of a capacity of the storage device between the first part and the second part, based on the comparison of the performance measure of the second part and the performance measure of the other part of the storage device.

11. The computer system according to claim 10, wherein:

at least one of the operating status of the first part and the operating status of the second part comprises a set of response times for data access to a corresponding part.

12. The computer system according to claim 11, further comprising:

program instructions to obtain a performance measure of a corresponding part based at least on a sum of the set of response times.

13. The computer system according to claim 10, wherein the program instructions to collect the operating status of the first part and the operating status of the second part comprise:

program instructions to determine a status of at least one of read/write type, data amount, and position characteristic associated with data access of the first part.

14. The computer system according to claim 13, further comprising:

program instructions to calculate a weight based on the status; and program instructions to obtain a performance measure of a corresponding part based on a sum of the set of response times that is weighted using the calculated weight.

15. The computer system according to claim 10, program instructions to compare the performance measure of the first part, the performance of the second part, and a performance of another part of the storage device, comprise:

in response to a difference between the performance measure of the first part and the performance measure of the second part satisfying a first threshold condition, program instructions to reallocate at least one part of the first part in the storage device to be used as cache storage, wherein the first threshold condition is the performance measure of the first part and the second part in the storage device.

16. The computer system according to claim 15, wherein a capacity of the reallocated at least one part of the first part in the storage device is kept greater than or equal to a first threshold capacity, wherein the first threshold capacity is associated with a first overall capacity of the first part and the second part in the storage device.

17. The computer system according to claim 10, further comprising:

in response to a difference between the performance measure of the first part and the performance measure of the second part satisfying a second threshold condition, wherein the second threshold condition is the performance measure of the first part and the second part in the storage device, program instructions to reallocate at least one part of the second part in the storage device to be used as tiering storage, wherein a capacity of the reallocated at least one part of the second part in the storage device is kept greater than or equal to a second threshold capacity, wherein the second threshold capacity is associated with a second overall capacity of the first part and the second part in the storage device.

18. A computer program product for adjusting allocation of a storage device, a first part of the storage device being allocated to tiering storage, a second part of the storage device being allocated to cache storage, the computer program product comprising:

one or more computer readable storage media and program instructions stored on the one or more computer readable storage media, the program instructions comprising:

program instructions to collect an operating status of the first part and an operating status of the second part;

program instructions to obtain a performance measure of the first part based on the operating status of the first part;

program instructions to obtain a performance measure of the second part based on the operating status of the second part;

program instructions to select, from the first part of the storage device, another part of the storage device whose capacity is equal to that of the second part;

program instructions to obtain a performance measure of the other part based on an operating status of the other part;

program instructions to compare the performance measure of the performance measure of the second part and the performance measure of another part of the storage device; and program instructions to adjust allocation of a capacity of the storage device between the first part and the second part, based on the comparison of the performance measure of the second part and the performance measure of the other part of the storage device.

* * * * *